United States Patent
Franke et al.

(10) Patent No.: US 6,469,655 B1
(45) Date of Patent: Oct. 22, 2002

(54) SURVEILLANCE SYSTEM FOR TERRESTRIAL NAVIGATIONAL AND AIRPORT LANDING SYSTEMS

(75) Inventors: Erich Franke, Konigsbach-Stein; Herbert Kleiber, Ludwigsburg, both of (DE)

(73) Assignee: Airsys Navigation Systems GmbH, Stuttgart (DE)

( * ) Notice: Subject to any disclaimer, the term of this patent is extended or adjusted under 35 U.S.C. 154(b) by 0 days.

(21) Appl. No.: 09/890,974

(22) PCT Filed: Feb. 8, 2000

(86) PCT No.: PCT/EP00/01323

§ 371 (c)(1),
(2), (4) Date: Aug. 8, 2001

(87) PCT Pub. No.: WO00/48015

PCT Pub. Date: Aug. 17, 2000

(30) Foreign Application Priority Data

Feb. 8, 1999 (DE) .......................................... 199 04 842

(51) Int. Cl.⁷ .............................................. G01S 13/00
(52) U.S. Cl. ............................. 342/36; 342/33; 342/35
(58) Field of Search ............................... 342/29, 32, 33, 342/35, 36

(56) References Cited

U.S. PATENT DOCUMENTS

| | | | |
|---|---|---|---|
| 3,818,476 A | 6/1974 | Coulter et al. | |
| 4,005,427 A | * 1/1977 | Hofgen | 343/106 |
| 4,027,289 A | * 5/1977 | Toman | 340/172.5 |
| 4,107,688 A | * 8/1978 | Alford | 343/108 |
| 4,333,081 A | 6/1982 | Hoefgen | |
| 4,387,375 A | 6/1983 | Kleiber et al. | |
| 4,414,632 A | 11/1983 | Murrell | |
| 4,506,332 A | 3/1985 | Bloch et al. | |
| 4,940,984 A | 7/1990 | Kleiber | |
| 5,130,716 A | 7/1992 | Kleiber | |
| 5,248,983 A | 9/1993 | Kleiber et al. | |
| 5,254,998 A | * 10/1993 | LaBerge et al. | 342/173 |
| 5,629,691 A | * 5/1997 | Jain | 340/961 |
| 5,826,171 A | 10/1998 | Franke | |
| 6,097,338 A | 8/2000 | Rupprecht et al. | |

FOREIGN PATENT DOCUMENTS

GB 1 398 005 6/1975

* cited by examiner

*Primary Examiner*—Thomas H. Tarcza
*Assistant Examiner*—Brian Andrea
(74) *Attorney, Agent, or Firm*—Oblon, Spivak, McClelland, Maier & Neustadt, P.C.

(57) ABSTRACT

The invention deals with a surveillance system for terrestrial navigational and landing systems, in which the navigational signals being transmitted for aeroplanes or other airborne objects by the navigational and airport landing systems are received and evaluated by a ground-based receiving and control facility. In this system: the receiving and control facility is equipped with a plurality of additional receiving stations; these additional receiving stations operate in the frequency range of the navigational signals; the additional receiving stations are arranged geographically distributed within the transmitting range of the navigational or airport landing system; the signals recorded by the additional receiving stations are forwarded to a central evaluating unit.

5 Claims, 2 Drawing Sheets

SURVEILLANCE SYSTEM FOR TERRESTRIAL NAVIGATIONAL AND AIRPORT LANDING SYSTEMS

FIELD OF THE INVENTION

The invention relates to a surveillance system for terrestrial navigational and airport landing systems.

BACKGROUND OF THE INVENTION

Such navigational and landing systems are used in civil and military air travel, both for position and course fixing and for helping aeroplanes to land. Examples of navigational systems for position and course fixing include so-called VOR (Very High Frequency Omnidirectional Range) and DVOR (Doppler VOR) rotating radio beacons, which are predominantly employed in civil applications, and the TACAN system which is predominantly used in military applications. Also included in this category are distance measuring installations such as DME (Distance Measuring Equipment), and beacon systems such as NDMs (Non-Directional Beacons).

Examples of landing systems include the widely used instrument landing system ILS and the comparatively new microwave landing system MLS. Components in landing systems further include systems based on differential GPS (correction data transmission).

All the systems cited above entail installing transmitting stations on the ground which transmit corresponding signals; the signals are received on board the aeroplanes, evaluated in the navigational equipment for position and course fixing, and utilised in the landing aid facilities for determining localisation and angle of approach.

International authorities such as the ICAO standardise certain operating parameters throughout the world.

Safety aspects naturally play a defining role in determining these operating parameters, i.e. particularly in the case of the transmitting stations it is necessary to adopt measures that guarantee the maximum degree of safety both with regard to the construction of the transmitting stations and with regard to the operation thereof.

Such safety-related measures are laid down by the aforementioned ICAO international authority in the so-called International Standards and Recommended Practices. Where the integrity of the transmitted signals is at issue, then for example certain surveillance systems are provided such as the known Far Field Monitor (FFM) for the aforesaid ILS instrument landing system. This FFM (far field monitor) monitors the technical quality of the localising information in the final phase of the landing approach.

This type of known surveillance system principally monitors, and if necessary corrects, those faults that are contained in the transmitted signal itself.

In addition to such faults or signal distortions that occur within the system itself, other influences coming from outside also appear which can result in the signals here designated overall as navigational signals either being unable to be evaluated in the aeroplane or else—and this may have more serious consequences—leading to false evaluation results. Possible sources of such external faults may for example be radio transmitters, or the deliberate broadcasting of differential GPS data in the VHF band, or transmitters of other radio-communication services, which for example due to their own operating malfunctions broadcast interference signals in frequency ranges that are within range of the operating frequency of the navigational or landing system.

However, because as a rule such transmitters are fixed installations, the fact that they broadcast publicly means that their operating data are known and are readily identifiable, and systematic technical and organisational rectification of the problem is possible.

Far more dangerous faults or falsifications of the navigational signals may be caused by transmitters that are only introduced periodically into the geographical vicinity of the navigational or airport landing systems and operated there. For present purposes it is immaterial whether the perturbation or falsification of the navigational signal is due to a malfunction or to an intentional transmission.

Existing known surveillance systems for navigational and airport landing systems do not provide for systematic monitoring of such perturbations and are therefore not suitable either.

The patent U.S. Pat. No. 4,333,081 describes a monitoring system for scanning-beam microwave landing apparatus. The patent U.S. Pat. No. 3,818,476 describes a navigation aid transmitter-monitor system.

It is therefore the object of the present invention to create a surveillance system for terrestrial navigational and airport landing systems in which the navigational signals for aeroplanes or other airborne objects transmitted by the navigational and airport landing systems are received and evaluated by a ground-based receiving and control facility; it should also be possible to use said surveillance system effectively when faults or falsifications of the last-named type occur.

The measures cited in claim 1 are proposed in order to accomplish this object The advantage of this solution lies in the fact that the additional receiving stations and their geographical distribution enable position-fixing of the rogue transmitter using per se known methods, such as for example the hyperbolic sectioning method or the like, and the central evaluating unit, which in any case operates with conventional digital signal processing methods for the FFM mentioned in the introduction, such as for example FFT (Fast Fourier Transform) algorithms, is in addition able to identify the rogue signals.

For maximum simplicity and reliability of the co-operation between the additional receiving stations and the central evaluating unit, one embodiment of the invention provides for proceeding in accordance with the features of claim 2. Because the transmitting data of the system's own transmitters and any stationary rogue transmitters are known in the central evaluating unit, it is possible in accordance with the features of claim 3 to ascertain the geographical co-ordinates of the unknown rogue transmitter. Claim 4 sets out how the content of the transmitting signal from the unknown rogue transmitter is evaluated.

According to a further embodiment of the invention corresponding to claim 5, it is advantageous that with central evaluation there is the possibility of selecting suitable counter-measures by comparing the navigational signal and the rogue signal.

Further details and advantages of the invention may be taken from the description which follows of an exemplifying embodiment.

DETAILED DESCRIPTION OF THE DRAWINGS

Figure 1:
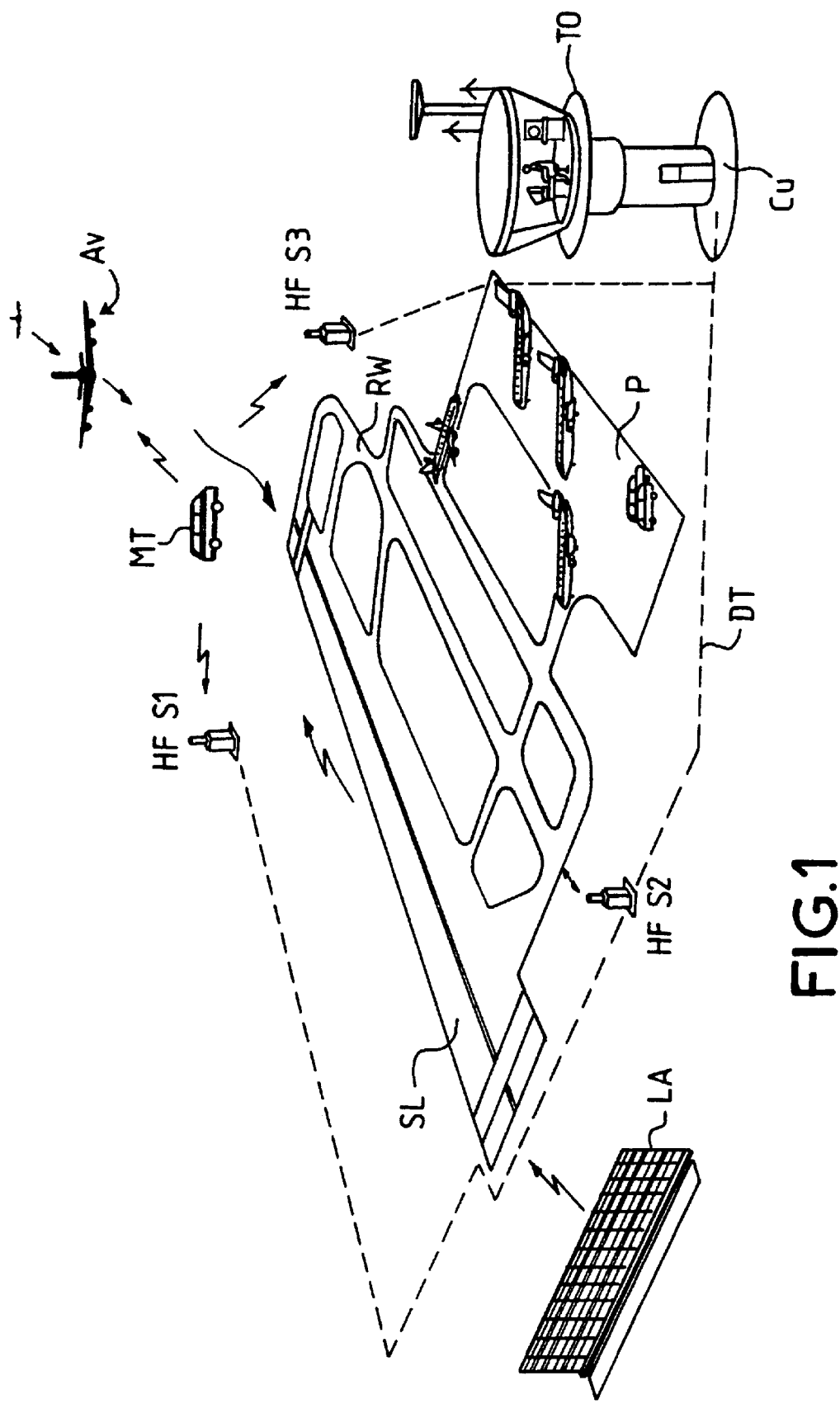
FIG. 1 shows a schematic view of the geographical distribution of the additional receiving stations in the vicinity of an airport.

FIG. 1 shows a view of an airport with its essential elements such as take-off and landing strip SL, access roads RW to the take-off and landing strip SL, parking area P, and tower TO. At the lower edge of FIG. 1 the transmitting antenna LA of the airport landing system is shown. Distributed geographically around the airport are the additional receiving stations HF S1 HF S2 and HF S3. MT identifies a picture of a vehicle symbolising a rogue transmitter MT which is only temporarily in operation and/or mobile. Lastly Av denotes an aeroplane which is in the process of making its landing approach and is receiving the signals transmitted by the transmitters LA and MT.

It has not been deemed necessary here to separately depict a rotating radio beacon (VOR; DVOR) or beacon system used for position and course fixing, since such a depiction cannot be expected to provide any additional information in terms of an understanding of the invention.

The line of dashes DT represents the link used for data transmission between the individual additional receiving stations HF S1, HF S2 and HF S3 and the central evaluating unit CU, with the central evaluating unit in this example being spatially associated with the tower TO. The antenna station LA is used to transmit to the aeroplane, which is to say in this case the aeroplane Av, the landing signals needed for landing, e.g. ILS landing signals, which contain information about the approach heading and/or angle of approach. Assuming that at the same time the mobile transmitter MT is also transmitting signals in the frequency range of the ILS landing signals and of a corresponding strength, it must be expected that the signals received in the aeroplane Av will be disrupted. Depending on the type of signals being transmitted by the mobile transmitter MT, this disruption will either result in the aeroplane's on-board receiving instruments being unable to evaluate the landing signals from the ILS system or in the evaluation giving false results, which in certain circumstances would be far worse.

In accordance with the invention, however, the landing signal from the ILS landing station which is being disrupted by the mobile transmitter MT is received not only by the receiving instruments on board the aeroplane Av, and if appropriate by the instruments (not shown) of the FFM far field monitor described in the introduction, but also by the additional receiving stations HF S1, HF S2 and HF S3 installed in a geographically distributed manner. Three such additional receiving stations HF S(1 . . . 3) are represented In the example shown. As a rule the use of conventional position fixing methods calls for at least three spatially separately positioned sensors in order to obtain unambiguous evaluations. Just how many such sensors or—as here— additional receiving stations HF S1 to HF Sn actually are employed depends on other parameters, as does their exact spatial arrangement.

Such parameters for example include the extent and geometry of the airport, the number and layout of the approach areas, topography and density of the built-up environment, and the necessary so-called safety level (for example as laid down by the ICAO).

However, it is not necessary to fully cover all possible parameters in order to understand the invention.

Figure 2:
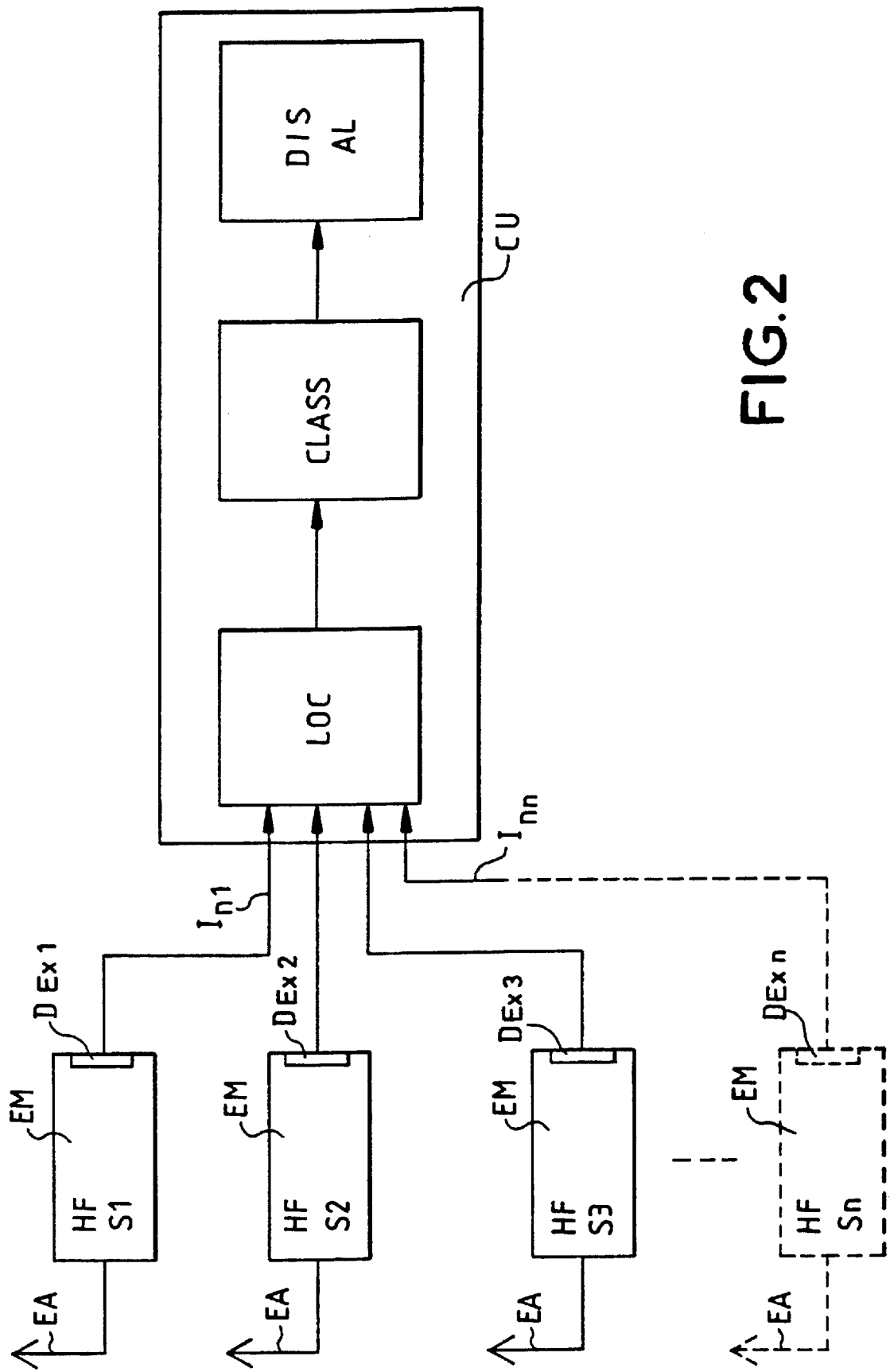
FIG. 2 shows the block diagram of the functional units of the surveillance system.

FIG. 2 is a block diagram representing the functional units of the surveillance system that are crucial to the invention.

The spatially distributed additional receiving stations HF S1 to HF Sn set up within the operating range of the navigational or airport landing system consist essentially of the receiving antenna EA, the actual HF receiving section EM and the output unit D Ex (1 to n). The HF receiving section EM is made up of amplifiers, filters, mixers and synthesisers. The mode of operation of such a receiving section EM with its aforementioned elements is known and is not the subject of the invention, therefore a detailed explanation is not given here.

The signals received in this way are processed at the output in such a way in a suitably configured evaluating unit D Ex and provided with the necessary additional information that the central evaluating unit CU is supplied with the information needed for position fixing and classification. Obviously the processing operation in the evaluating unit must also take account of the technology and the transmission characteristics of the DT link between the additional receiving equipment HF S(1 . . . n).

Evaluation of the signals recorded by the individual additional receiving stations HFS(1 . . . n) takes place in the central evaluating unit CU. This evaluating unit has essentially three important functional units within the framework of the invention, which in FIG. 2 are likewise represented in block diagram form. Used for the actual evaluation of the signal are firstly the Loc unit provided for position fixing, and the Class unit for classifying the received signals. In the Dis-AL unit the output from the Loc and Class units, possibly together with other criteria/information, is then combined and evaluated in such a way that as a result an alarm is triggered, for example in the flight management, and/or further safety measures can be taken.

In FIG. 2 the additional receiving stations—as shown— are individually linked to the central evaluating unit CU, and this enables the geographical allocation of the output signals of the outputs DEx 1 to n to be readily performed by means of the respective connections In 1 to In n. In the case of a single link DT as in FIG. 1, it is necessary to first of all prime the output signals with information. Further typical data relevant for position fixing are the time of reception, the duration of the signal and its measurement. As the position-fixing method it is, for example, possible to use the hyperbolic sectioning method already mentioned in the introduction, which is considered to be advantageous in terms of its cost and the integrability of its circuits. In general terms the choice of the position-fixing method is also determined by its detection speed, its position-fixing accuracy and its ability to simultaneously fix the positions of a plurality of signal sources. The above criteria are of course inseparably bound up with the function of classifying the signal or signals, In addition, the Class unit evaluates the signal strength, the temporal characteristics of the signal, the frequency spectrum, carrier frequency, modulation frequencies and the degree of modulation. With the conventional digital signal processing method, using the FFT (Fast Fourier Transform) algorithms, it is possible to detect and evaluate the rogue signals in the frequency band of the radio channel utilised for the navigation and for the landing system. By additionally taking into account the operating parameters of the respective navigational and/or landing system it can then be decided whether the disturbances found are of an intensity and type likely to disrupt the proper reception and evaluation of the wanted signal.

Depending on this decision, with the help of the Dis-AL functional unit the necessary measures are then initiated in the technical field or by calling security personnel.

Because all the receiving and evaluating units whose objectives and mode of operation have been cited above are present either in full or in part in a different scenario, e.g. in the cited FFM system, a further advantage of the surveillance system according to the invention is the option to integrate the use of these pre-existing facilities. This also means that it is possible for the surveillance function of the system in accordance with the invention to be expanded to other frequency ranges with transparency of financial outlay.

What is claimed is

1. Surveillance system for terrestrial navigational and landing systems, in which the navigational signals being transmitted for aeroplanes (Av) or other airborne objects by the navigational and airport landing systems are received and evaluated by a ground based receiving and control facility, the signals being disrupted by a mobile transmitter (MT):

the receiving and control facility being equipped with a plurality of receiving stations (HF S1, HF S2, HF S3), these receiving stations operate in the frequency range of the navigational signals, the receiving stations are arranged geographically distributed within the transmitting range of the navigational or airport landing system, the signals recorded by the additional receiving stations are forwarded to a central evaluating unit (CU), characterized in that the signals transmitted by the navigational and airport landing system being disrupted by a mobile transmitter (MT), those signals are also received by the receiving stations (HF S1, HF S2, HF 33) to detect the signals from the mobile transmitter (MT).

2. Surveillance system according to claim 1, characterized in that the signals recorded by the receiving stations are given additional identification codes before being forwarded to the central evaluating unit.

3. Surveillance system according to claim 2, characterized in that the signals recorded by the receiving stations are evaluated in relation to the location of their transmitter.

4. Surveillance system according to claim 2, characterized in that the signals recorded by the receiving stations are evaluated in relation to their type, duration, and content.

5. Surveillance system according to claim 1, characterised in that in the event of detecting a disruption to the wanted signal, the central evaluating unit transmits a corresponding alarm signal to initiate suitable measures in each case.

* * * * *